United States Patent [19]

Schaefer

[11] 4,213,770

[45] Jul. 22, 1980

[54] ENGINE EMISSION POLLUTANT SEPARATOR

[76] Inventor: John W. Schaefer, 640 Murray La., Des Plaines, Ill. 60016

[21] Appl. No.: 25,860

[22] Filed: Apr. 2, 1979

Related U.S. Application Data

[63] Continuation-in-part of Ser. No. 764,707, Feb. 1, 1977, abandoned, which is a continuation of Ser. No. 566,608, Apr. 8, 1975, abandoned, which is a continuation-in-part of Ser. No. 415,649, Nov. 14, 1973, abandoned, which is a continuation-in-part of Ser. No. 308,496, Nov. 21, 1972, abandoned.

[51] Int. Cl.$^2$ .................. B01D 51/00; F02B 33/00
[52] U.S. Cl. ........................... 55/269; 55/321; 55/327; 55/328; 55/417; 55/420; 123/41.86; 123/574
[58] Field of Search .................. 55/261, 267–269, 55/319, 320, 321, 327, 328, 417, 420, DIG. 19; 123/119 B, 41.86

[56] References Cited

U.S. PATENT DOCUMENTS

| | | | |
|---|---|---|---|
| 1,443,435 | 1/1923 | Rohrer | 55/269 |
| 2,461,206 | 2/1949 | Fouse | 123/119 B |
| 2,742,057 | 4/1956 | Kriek | 123/119 B |
| 3,164,141 | 1/1965 | Jones | 123/119 B |
| 3,165,097 | 1/1965 | Lowther | 123/119 B |
| 3,236,216 | 2/1966 | Van Dolan | 55/DIG. 19 |
| 3,335,549 | 8/1967 | Hendrix | 55/91 |
| 3,450,114 | 6/1969 | Miles | 123/119 B |
| 3,463,132 | 8/1969 | Kriek | 123/119 B |
| 3,463,189 | 8/1969 | Fitzpatrick | 137/525.3 |
| 3,616,802 | 11/1971 | Marinaccio | 55/417 |

FOREIGN PATENT DOCUMENTS

902259 2/1944 France ............................ 55/476

*Primary Examiner*—Bernard Nozick
*Attorney, Agent, or Firm*—Robert L. Lindgren

[57] ABSTRACT

A pollutant separator having a cooling coil and a filter includes a scrubber device. The scrubber has a tube with holes in the walls thereof for the passage of fluid to and from a closed collection chamber. A series of spring biased balls within the tube serve as scrubber elements. Extending around part of the outside of the tube is a slidable spring-biased ring valve having a shoulder on which fluid pressure is exerted through a passage extending from inside the tube. The ring valve slides over some of the tube holes causing fluctuations in pressure within the scrubber unit to enhance vibratory, scrubbing motion of the balls contained therein.

9 Claims, 19 Drawing Figures

ENGINE EMISSION POLLUTANT SEPARATOR

BACKGROUND OF THE INVENTION

This is a continuation-in-part of my copending application, Ser. No. 764,707, filed Feb. 1, 1977 now abandoned, which is in turn a continuation of my abandoned application, Ser. No. 566,608, filed Apr. 8, 1975, which was a continuation-in-part of my application Ser. No. 415,649 now abandoned, filed November 14, 1973, which was in turn a continuation-in-part of my abandoned application, Ser. No. 308,496, filed Nov. 21, 1972, and entitled Engine Emission Pollutant Separator.

This invention relates to a pollutant separator for removing pollutant material from internal combustion engine emissions.

More specifically, the invention relates to an engine emission pollutant separator wherein the engine emissions and blow-by gases are directed to the novel separator which acts to remove pollutants and contaminants therefrom. The separator operated to reduce the temperature of the emission vapor to remove pollutants which precipitate at the lower temperatures. The vapor is then filtered to remove more solids, fluids, tars, and sludges. The substantially purified gas is drawn from the separator through a novel scrubber unit which mechanically removes additional pollutants.

During the operation of an internal combustion engine, vapors accumulate in the crankcase of an engine from the various sources. These vapors contain numerous liquid and solid contaminants which not only cause atmospheric pollution but reduce the overall efficiency of the engine. The accumulation of such emissions in the crankcase causes carbon build-up in the firing chamber, non-flexing of piston rings, more rapid cylinder wear, improper valve operation, and sludge deposits in upper engine areas.

In the prior art, it was common to remove crankcase engine emissions by permitting them to pass into the atmosphere which obviously contributes to the overall pollution of the air. Attempts have also been made to utilize devices which receive the crankcase emissions for removal of the contaminants therein and return the purified gas back to the engine. The prior art devices heretofore utilized to achieve separation of pollutants in the emission vapor have been deficient in several aspects since many of the devices of the prior art tend to be noisy and inefficient in effectively removing the contaminants. Moreover, the prior art techniques are deficient in achieving an extended lifetime of operation and are not adaptable for use on automobile engines which were already manufactured and in service. Many previous devices also possess a relatively complex design making such pollutant separators relatively expensive to manufacture, install and operate.

SUMMARY OF THE INVENTION

It is therefore an object of this invention to reduce atmospheric pollution.

A further object of this invention is to improve the performance of an internal combustion engine.

Another object of this invention is to remove pollutants and contaminants present in engine crankcase emissions.

A still further object of this invention is to improve the efficiency of a device for removing liquid and solid pollutants from a gaseous crankcase emission.

The novel invention provides numerous improvements over prior art techniques. The novel design of the separator of the invention permits the device to be installed on automobiles already in operation, and when installed, results in significant increased performance of the engine. Such increased performance achieves greater gas mileage, eliminates sludge in the engine, increases horse power, improves combustion, achieves cleaner, more consistent, surer action of components exposed to the firing of the fuel mixture and provides longer engine life. Moreover, the device herein disclosed and easily installed and maintained with ready pollutant disposal through the use of throw-away filters and the like. No adjustments are required during the operation of the device and its simple design permits the separator to be inexpensively manufactured and operated. Further, the device is compact in size to allow installation when there is limited space available under the hood as in certain automobiles or trucks. It is also a characteristic of the pollutant separator of the invention to function without failure for extended periods of time.

These objects and improvements are achieved in accordance with the present invention wherein a pollution separator for reducing contaminants in a flow from a source of emission to a utilization point is provided. A cooling coil and filter means, respectively, feed a scrubber unit according to the invention. The scrubber unit includes a closed chamber and a primary scrubbing tube having a plurality of holes therein which communicate with the closed chamber. A plurality of scrubber elements are movably positioned within the bore of the primary scrubber tube and are biased by a plurality of springs contained therein. A ring valve movably covers a portion of the outer surface of the tube with the ring valve having a shoulder portion which mates with a corresponding shoulder on the scrubber tube. The fluid passage connecting the interior of the scrubber tube to the surface of the scrubber tube shoulder is provided such that fluid pressure is exerted through the fluid passage to the shoulder of the ring valve to provide fluctuating pressure within the scrubber means to enhance motion of the scrubber balls therein. According to another aspect of the invention the scrubber unit includes a spring-biased ball check valve. Another aspect of the invention includes an outlet check valve as well as an air inlet valve for admitting air into the outlet in response to fluid pressure within the outlet. According to a further aspect of the invention, a second scrubber unit is provided with a plugged outlet so that fluid circulates between the second scrubber unit and the closed chamber.

BRIEF DESCRIPTION OF THE DRAWINGS

The objects of this invention, together with the features contributing thereto and advantages accruing therefrom, will be apparent from the following description of general embodiments of the invention when read in conjunction with the accompanying drawings, wherein.

DESCRIPTION OF THE PREFERRED EMBODIMENT

Figure 1:
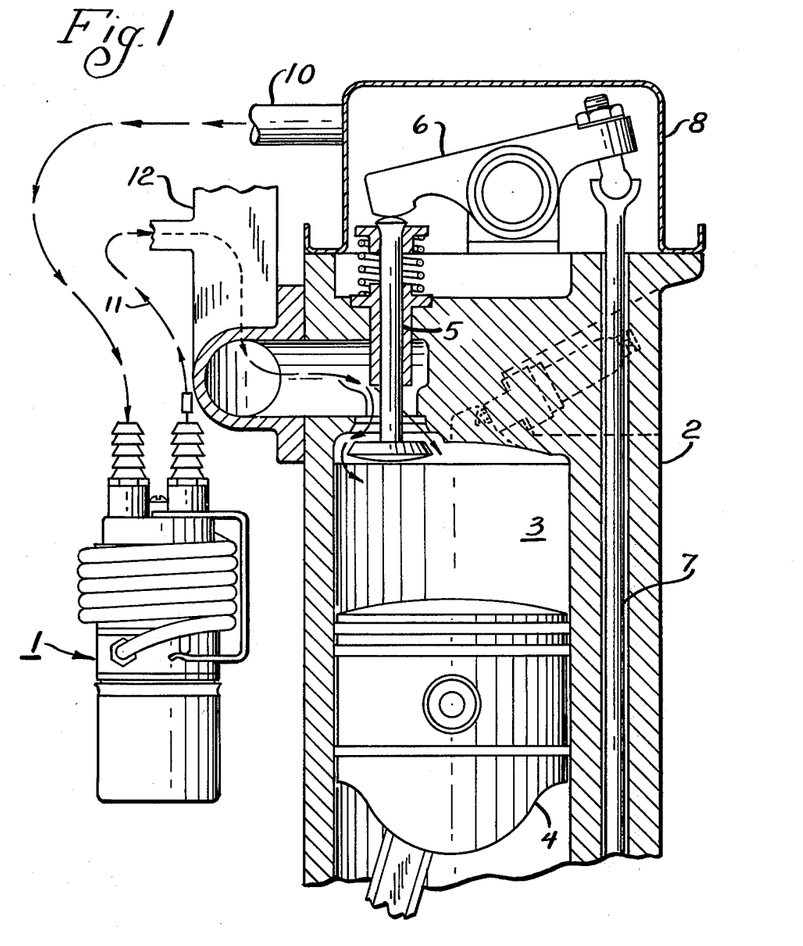
FIG. 1 is an end schematic illustration of an internal combustion engine having an embodiment of the pollutant separator device of the invention in operative coupling thereto.

Referring now to FIG. 1 there is illustrated the novel pollutant separator device 1 of the invention in operative position in fluid communication with a conventional internal combustion engine 2. Internal combustion engine 2 is a conventional power plant for use in vehicles and the like and includes a cylinder 3 having a piston 4 for reciprocating movement therein. A conventional intake valve 5 positioned at the top of the cylinder is operatively connected to a rocker arm 6 mounted for pivotal movement on top of the engine block in coupled relationship to a pusher rod 7. A rocker arm cover 8 is mounted to the top of the engine and covers the rocker arm in a manner wellknown in the art.

Figure 2:
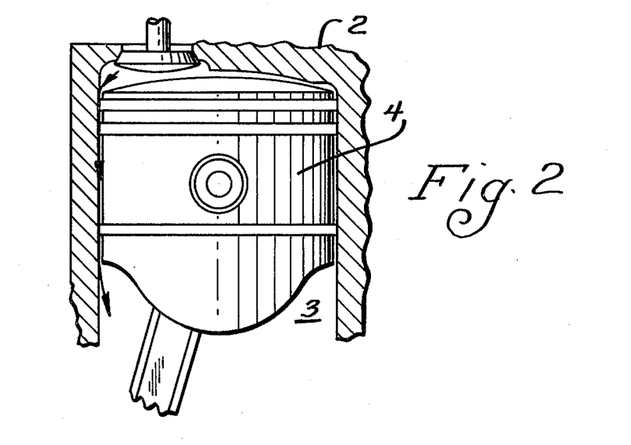
FIG. 2 is a partial schematic illustration of the internal combustion engine of FIG. 1.

During the operation of internal combustion engines, gas emissions having liquid and solid contaminants tend to accumulate within the rocker arm cover. Such emissions are created from the churning of oil which atomizes some sulfur and detergent additives that rise to the rocker arm cover. Also, when the piston is at the top of its stroke, liquid fuel is blown past the piston into the crankcase as shown in FIG. 2. The gases containing pollutants thereafter rise upward for accumulation within the rocker arm cover as discussed previously. Normally, these liquid and solid pollutants of the accumulated emission within cover 8 precipitate out and interfere with the operation of the engine.

The contaminants in the gases are removed by pecipitator or separator 1 of the invention by attaching a conduit 10 in fluid communication with both the internal chamber of rocker arm cover 8 and precipitator device 1 of the invention. After separating the contaminants from the emission, an outlet line 11 directs the cleansed gas from the precipitator to intake manifold 12 of the internal combustion engine to inject the gas into the engine. The emissions are drawn through the separator 1 and fluid lines 10 and 11 by the vacuum created at the intake manifold of the engine. The purified gas passing through conduit 11 is "sucked" into the firing chambers with the charge of fuel.

Referring now to FIGS. 3 to 6, pollutant separator device 1 of the invention is best shown. Conduit 10, coupling the rocker arm cover chamber to the pollutant separator 1, is connected to an inlet coupling member 20 of the separator. Inlet coupling member 20 is mounted on an upper cap 21 made of suitable material such as metal and the like which includes an internal flow passage 22 which is directed downwardly and then laterally through the wall of the cap. A hose receiving port 23 couples passage 22 with an externally positioned helical tubing or coil 24 which is in surrounding relationship to a substantial portion of housing 25 on which cap 21 is sealingly positioned. Coil 24 is formed of a suitable heat dissipating material such as copper tubing or other similar type metal or plastic material to act to cool the emission and blow-by gases which are introduced through conduit 10 into separator device 1.

Figure 3:
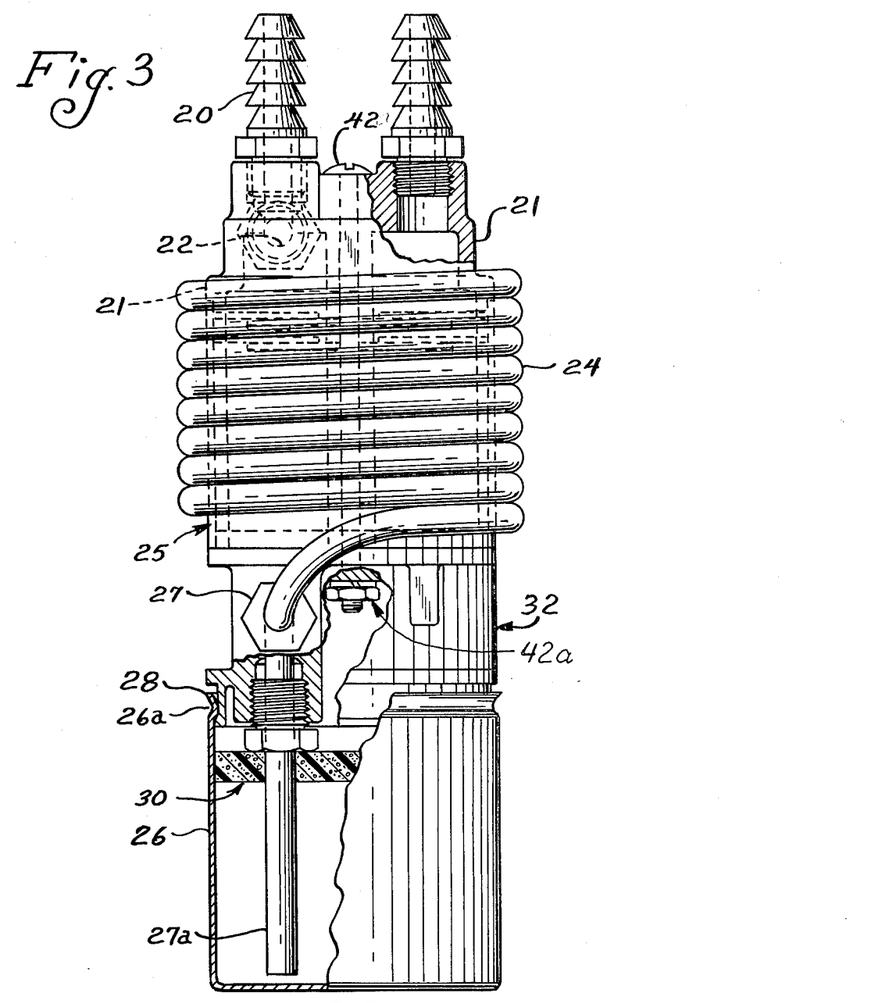
FIG. 3 is a side schematic illustration with parts broken away of one embodiment pollutant separator device of the invention as shown in FIG. 1.
Figure 4:
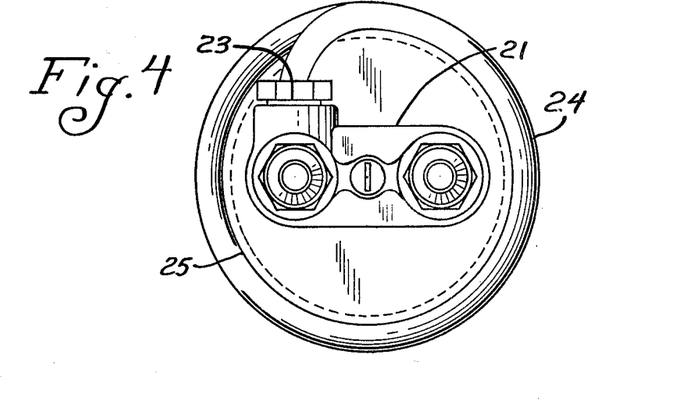
FIG. 4 is a top schematic illustration of the pollutant separator device of FIG. 3.

The tube carries the emission stream being cooled to housing base 32 coupled to the bottom of housing 25. During the passage of the vapor through the coil, the air flows past the coil, carries away heat which is conducted from the emission stream through the coil tubing wall and thus cools the emissions that are passing through the coil. That fraction of the stream which is responsive to precipitation at this reduced temperature "drops out" and is carried down into the filter cup 26.

Coil 24 is in fluid communication with filter cup 26 through a 90° hose adapter 27 extending through the bottom of housing base 32 and which directs flow inwardly of the housing from the coil through a downward extending pipe 27a into filter cup 26. As best shown in FIG. 3, filter cup 26 is detachably affixed to the bottom of housing base 32 by means of a lip 26a provided on the top of filter cup 26 which interfits with a corresponding projection 28 at the housing base 32 to permit ready removal of filter cup 26 as needed.

Figure 9:
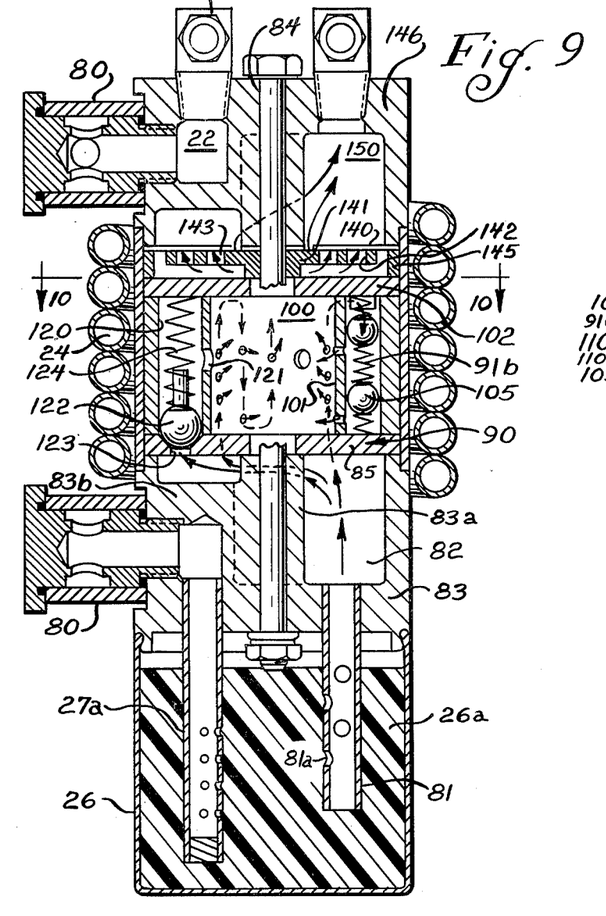
FIG. 9 is a side sectional illustration of the device of FIG. 7.
Figure 10:
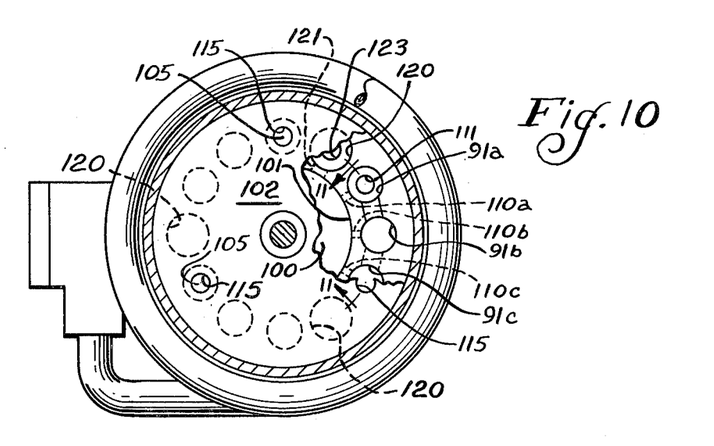
FIG. 10 is a sectional illustration taken along line 10—10 of FIG. 9 with parts broken away.

A filter 30 covers the top portion of filter cup 26 to filter the gas and precipitants which are directed upward as they exit through pipe 27a. While filter 30 is shown in FIG. 3 to partially fill cup 26, best results are achieved when the filter fills the entire cup as shown in FIG. 9. The filter 30 is of any suitable design and acts to remove the contaminants which were precipitated during cooling of the emission and blowby gases in coil 24. The filtered gas then passes upward through housing base 32 provided in housing 25 drawn by the vacuum of the internal combustion engine and reaches a restriction 33 within housing base 32. An expansion chamber 34 is positioned above the restriction 33 whereby the stream of gas expands into the chamber 34 and another reduction of temperature occurs to cause additional precipitation of the more viscous elements or contaminants within the gas stream and such contaminants are precipitated out in chamber 34.

Figure 5:
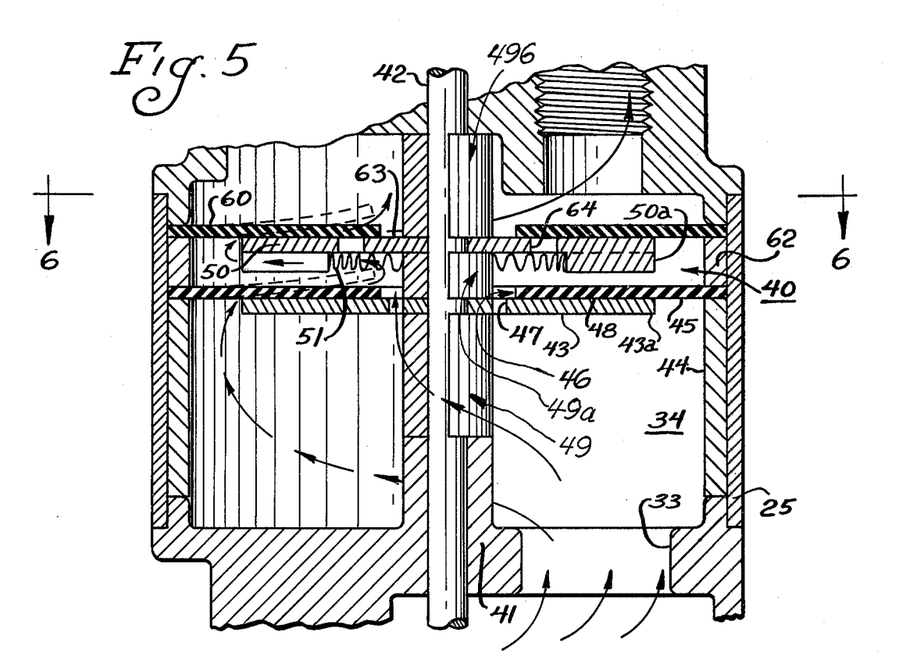
FIG. 5 is an enlarged partial side sectional illustration of the valving mechanism of the separator of FIG. 3.
Figure 6:
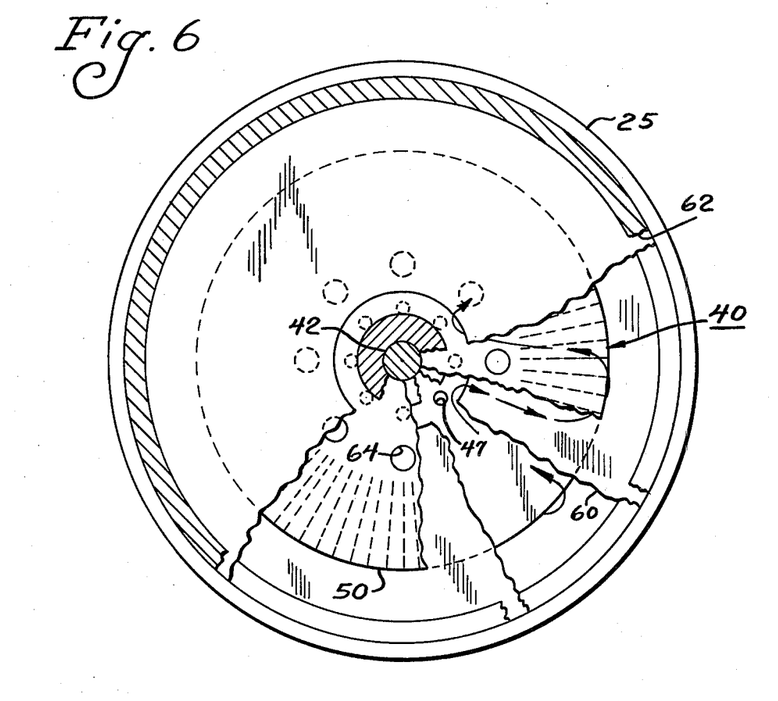
FIG. 6 is a top sectional illustration taken along line 6—6 with parts broken away of FIG. 5.

The gas then flows upward past a series of diaphragm valves 40 mounted within housing 25 as best shown in FIGS. 5 and 6. Base cap 32 includes a central hub portion 41 which receives an elongated rod 42 passing from the top of cap 21 and is secured to the portion by a nut and threaded end 42a as shown in FIG. 3. Referring to FIG. 5, a bottom flat disc member 43 of a suitable material such as metal is secured to rod 42 by means of tubular spaces 49, 49a and 49b and includes a peripheral edge 43a which is spaced from the inner surface of housing 25. A collar 44 is positioned on the inner surface of the housing and acts as a support for a flexible annular shaped member 45 which extends inwardly to be spaced from rod 42 and forms an inner flow passage 46 therebetween. A plurality of holes 47 are positioned on bottom member 43 and are in fluid communication with passage 46 formed by annular member 45.

Annular member 45 is formed of a suitable flexible material which permits the element to flex as pressure conditions dictate during operation of the device in a manner to be explained in detail later. In the non-flexed condition of annular member 45, a portion of the top of bottom disc 43 and the bottom of annular member 45 contact each other along an interface 48 whereby gas flow does not pass between the interface of the two elements.

An upper disc member 50 is mounted on rod 42 by any suitable techniques and possesses a circular configuration having an edge 50a spaced from the inner wall of housing 25. The bottom of the upper disc member 50 is formed with a convoluted appearance which forms a plurality of radially extending passages 51. A second annular shaped flexible member 60 is mounted above upper disc member 50 and is spaced from lower annular member 45 by a spacer 62. The inner periphery of the annular shaped member 60 is spaced from rod 42 and forms a flow passage 63 therebetween. Flow passages 51 created by the bottom of disc 50 extends from a point which is radially spaced outward from the position of a series of holes 64 provided through upper disc member 50 through which emissions may pass.

Under low flow and zero flow conditions of the emission through the housing, the upper annular member 60 is in contact with the upper surface of member 50 whereby holes 64 are covered thereby. The gaseous emission flows through holes 47 in lower plate 43 and is directed adjacent holes 64 of upper plate 50. As vacuum is increased at the intake manifold of the engine during operation, pressure causes upward flexing of upper diaphragm member 60 in a manner that holes 64 are uncovered to permit flow therethrough. As power is increased in the engine, the vacuum created in the intake manifold can increase to a point which effects flexing of upper annular diaphragm 60 to permit additional flow through bottom radial passages 51 of member 50 and the space created between flexed diaphragm 60 and disc 50.

In addition, the amount of vacuum created at higher levels of operation of the engine also can cause flexing of the lower diaphragm 45 in a manner that flow also can be created through interface 48 between lower disc 43 and diaphragm 45. Thus, the flow through diaphragm valve means 40 is automatically regulatable to control the amount of gas passing through separator 1 depending on encountered conditions. Moreover, the diaphragm valve 40 acts as a check valve to cut off flow to the engine to prevent possible engine back fires from igniting the gases in the separator or to prevent instantaneous back pressures caused by back fire from damaging the separator. The novel diaphragm valve further scrubs the gases by mechanical action to reduce any remaining pollutants to improve the overall efficiency of the separator. After passing through the diaphragm, the cleansed gas is then directed back into the intake manifold of the engine through conduit 11 which is coupled to cap 21.

Figure 7:
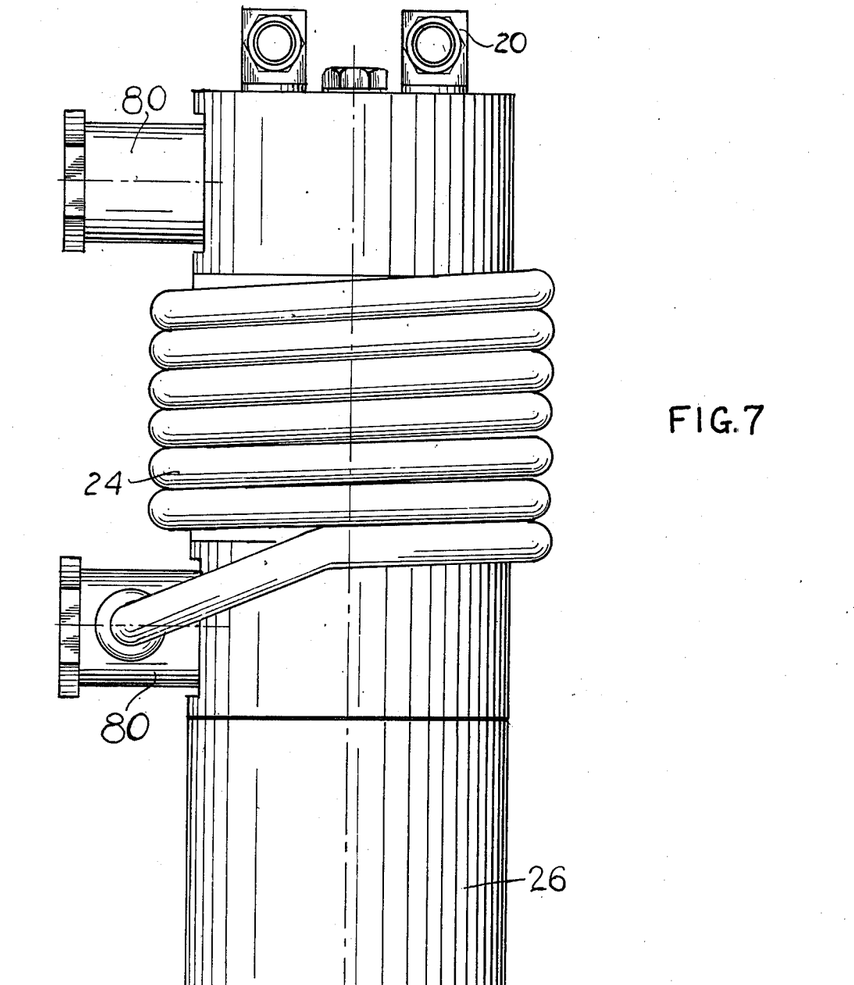
FIG. 7 is a side schematic illustration of another embodiment of the pollutant separator device of the invention.
Figure 8:
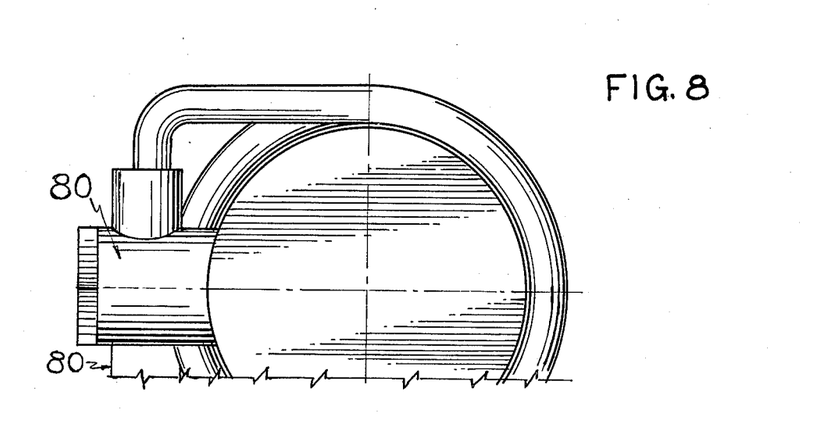
FIG. 8 is a top schematic illustration of the device of FIG. 7.

Referring now to FIGS. 7 through 12 there is illustrated another embodiment of the engine emission pollutant separator of the invention. The separator shown in FIGS. 7 through 12 is similar in operation to the embodiment described with reference to FIGS. 1 through 6 with the primary distinction in the fact that the scrubber portion of the device is modified. The flow of fluid having a mixture of pollutants passes from conduit 10 into inlet 20 as best shown in FIGS. 7, 8 and 9, through internal passage 22 into coil 24 to lower the temperature of the gas flow in a manner similar to that described with reference to the previously described embodiment.

A modification has been made to the attachment of the end of coil 24 to the body of the device as shown in FIG. 9 by the use of a right angle fitting 80 which overcomes the problem of attaching the coil in a bent manner to the body. The outlet portion of the coil in the lower portion of the device also includes a right angle fitting 80 whereby the flow passes through base cup 83 into downward extending filter pipe 27a and into filter cup 26 through filter pipe 27a. A filter 26a of any selected width is present in filter cup 26 to filter out the impurities which are precipitated out by means of the cooling process. The action of the filtering section of the precipitator is identical to that described with reference to the embodiment of FIGS. 1 through 6.

After being filtered the flow of gas with remaining pollutants enters a conduit 81 having a series of holes 81' to introduce the gas into chamber 82 which is positioned beneath the improved gas scrubbing means 90 as best shown in FIGS. 9 through 12.

Chamber 82 is formed within base cap 83 and extends circumferentially 360° around a central portion 83a of the base cap. Chamber 82 includes a segment 83a of approximately 270° and a second segment 82b of approximately 90°. The segment 82b possesses a smaller depth than segment 82a for the purpose of permitting fitting 80 to be attached to the body of separator. A plate 85 is attached to the top of base cap 83 to cover chamber 82 and to act as the bottom of scrubbing means of the invention.

Figure 11:
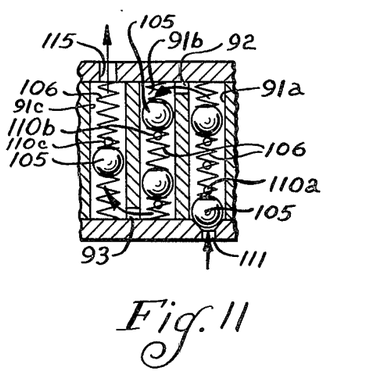
FIG. 11 is an enlarged sectional illustration taken along line 11—11 of FIG. 9.

Gas scrubbing means 90 is formed with an array of short conduits 91 which are arranged around a circular extent in a series of three designated as conduits 91a, 91b and 91c and are closed at bottom by plate 85. As best shown in FIG. 11, each of the series of conduits 91a, 91b and 91c are interconnected by means of a lateral milled out passage 92 of the scrubber means which permits flow of the gas from conduit 91a through passage 92 into conduit 91b and a passage 93 permitting flow between conduit 91b and 91c.

The scrubbing means thus includes three sets of three conduits 91 of nine such conduits in total whereby each series of three passages 91a, 91b and 91c are interconnected and arrayed around a central chamber 100 formed by a cylinder 101. The chamber and top of passages 91a, 91b and 91c are closed by an upper plate 102.

Each of the conduits 91a, 91b and 91c contain one or more elements 105 which are adapted to move within the conduits 91 in a manner that agitation is created because of the flow of gas to cause through actual physical contact the remaining impurities to be removed. The elements or spheres 105 have a diameter approximately equal to the internal diameter of the passages to not permit any substantial flow therepast. Although elements 105 are shown as spheres, it should be apparent members 105 can be of any shape which are economically feasible. The vibration and rapid action of the spherical elements cause them to shake off any adhering contaminants. The movement of the elements 105 is further enhanced by the presence of a spring member 106 which causes a vibratory action in response to the varying degrees of gas flow created by the vacuum in the engine.

As stated previously each of the sets of three vertically extending conduits 91a, 91b and 91c lie in an arcuate array and surround an internal chamber 100. The chamber is in fluid communication with each of the conduits by means of a series of openings 110a, 110b and 110c, respectively. Flow of gas into the array of passages 91 can pass from circumferential chamber 82 through an inlet 111 provided through plate 85 in communication only with one of conduits 91a in each set of passages. Thus, no direct fluid communication between chamber 82 and the other two passages 91b and 91c can occur without first passing into passages 91a. The interconnection and form of conduits 91a, 91b and 91c as shown in FIG. 11 are arranged to achieve greatest scrubbing action for a given length. As stated previously, spheres 105 are not positioned within the chamber to permit any substantial flow therepast, but because of their resilient mounting the elements or spheres 105 within the series of conduits 91a, 91b and 91c are caused to vibrate by the flow. Referring to FIG. 11 element 105 is pressed by spring means against the inlet port of conduit 91a whereby no substantial flow would be directed to port 111 when not in operation or certain low flow ranges. However, as flow rate increases through the scrubbing means, spheres 105 move up past one or more of the aperture 110a in its vibratory pattern thus allowing the flow of gas into the chamber 100 from chamber 82 and inlet 111.

The presence of the spheres blocking the flow obviously reduces the energy within the flow stream causing further precipitation by the vibratory motion of the spheres. The precipitated material tends to collect on the spheres but since they are being agitated the collected material then falls off. After falling off the precipitated material is carried by the flow into chamber 100 for depositing when the ports 110 are exposed to the flow through the movement of the elements 105. The flow into the chamber can return into any of the conduits 91a, 91b or 91c through any of the ports 101a, 101b and 101c at random. The flow in effect passes in and out of the chamber from one of the three conduits through the ports and back into the conduits and eventually to an outlet 115 formed through upper plate 102. Outlet 115 is provided in communication with conduit 91c and not with conduits 91a and 91c. Thus, the constant exposure of ports to the flow and the agitation of elements 105 mechanically removes the particles which are carried into chamber 100 to be left to collect. The flow eventually in its cleaned form moves outward from conduit 91c through outlet 115 which provides three outlets from the scrubber through plate 102 when considering the three sets of conduits 91.

There exists in addition to conduits 91, a series of three overload pipes 120 which have one or more holes 121 communication with internal chamber 100, one of which is best shown in FIG. 9. In some demand situations through the separator of the invention, there occurs certain high flow rates which can not be adequately handled by the series of conduits 91 such as in rapid acceleration of the vehicle and the like. Overload pipes 120 function to handle these high loads and include a spherical member 122 which is biased downward in a closed position by spring 124 against a port 123 through plate 85. Spring 124 possesses a higher resilient characteristic than springs 106 and ball 122 only opens at predetermined high flow rates through the separator.

The top of conduit 120 is closed by plate 102 and thus flow from conduit 120 can only occur through port 121 into chamber 100. Flow introduced into chamber 100 passes therefrom at ramdom through one of ports 110 in the series of conduits 91 in the manner previously described with respect to the flow pattern in conduits 91. The overload flow through conduit 120 eventually is subjected to substantial agitation in conduits 91 for additional removal of these pullutants. Thus, the separator can for certain duration handles very large flow rates through the separator.

The flow from the scrubber 90 exits upward through outlets 115 in 102 plate for return to the engine. To aid in protecting the device, a release check valve 140 is provided in the form of a flexible plate or leaf above the scrubber means. Valve 140 possesses an annular shape and is mounted on top of plate 142 is secured at its outer edges between suitable collar 145, 140 is secured at edges between a suitable collar 145 and an upper head cap 146 of the separator. Flow from the scrubber 90 is directed upward to flex valve 140 at its inner edge to open one or more ports 143 for flow into a circumferential chamber 150 and out the outlet of the separator. The release valve 140 instantly closes in the event of a backfire or reversal in the engine to which the separator is connected.

Although the embodiment of FIGS. 7 through 12 has been described as having nine conduits 91 and three overload pipes 120, it should be apparent to one skilled in the art that the number of elements and their particular arrangement around chamber 100 can be modified depending on encountered conditions. In addition, the conduit and pipes may be oriented in a horizontal direction where the flow moves from one pipe to another by connecting passages whereby the height of scrubber 90 can be reduced.

Figures 12, 13, 14:
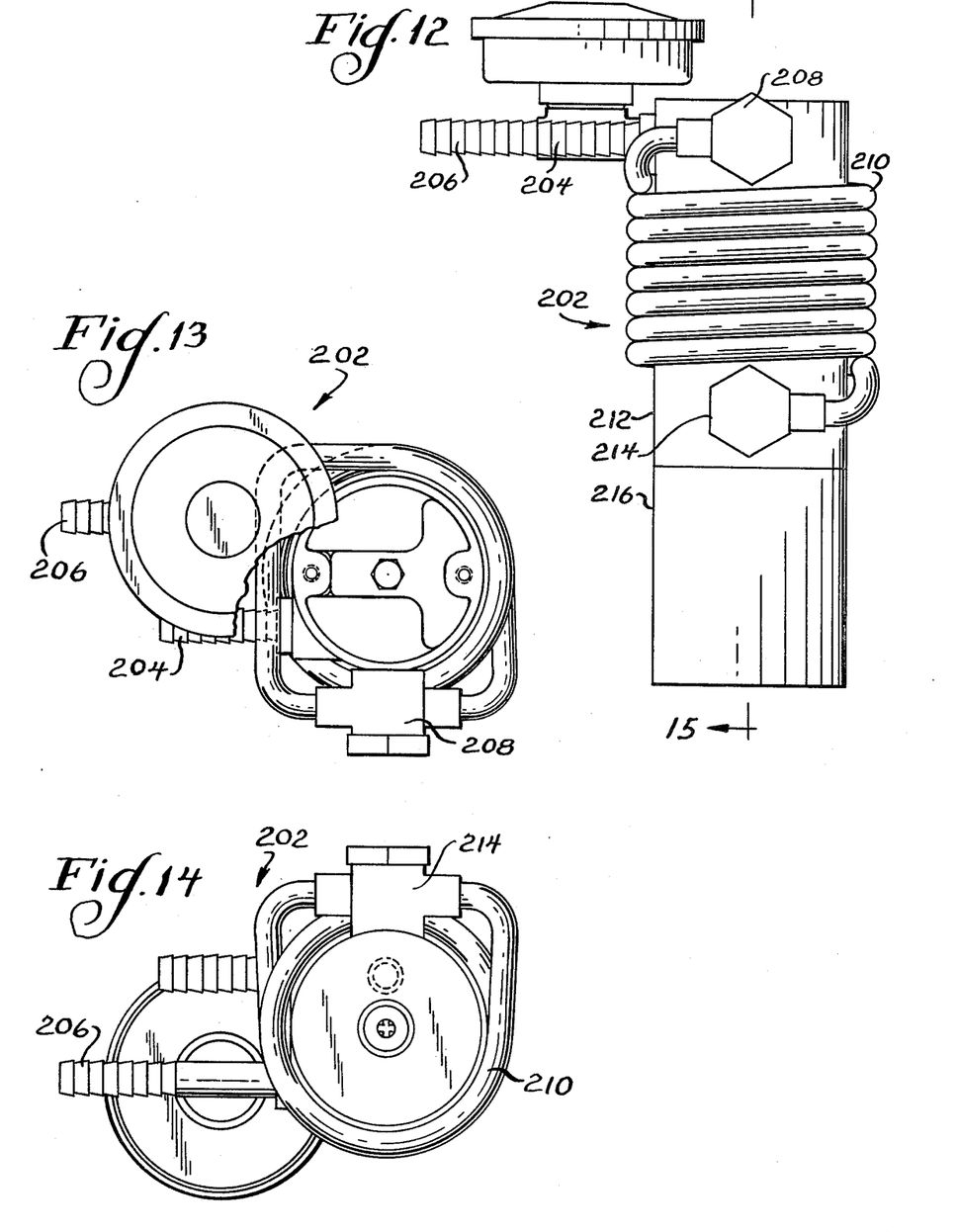
FIG. 12 is a side schematic view of another embodiment of the invention.
FIG. 13 is a top view of a device according to the invention.
FIG. 14, is a bottom view of a device according to the invention.

Referring now to FIGS. 12, 13 and 14 of the drawings another preferred embodiment of the invention is shown having a barbed inlet connector 204 and a barbed outlet connector 206 of designs well-known in the art. Fluid flows from a source of pollution (not shown) into the inlet connector 204 through the pollution separator 202 finally to the outlet connector 206. The inlet connector 204 communicates with the inlet fitting 208 of a helical cooling coil 210 which is wound around the outside of a housing fitted with a base cap 212 which is provided with a fitting 214 for admitting fluid into the base cap 212. A filter housing 216 is shown positioned at the lower end of the base cap 212.

Figure 15:
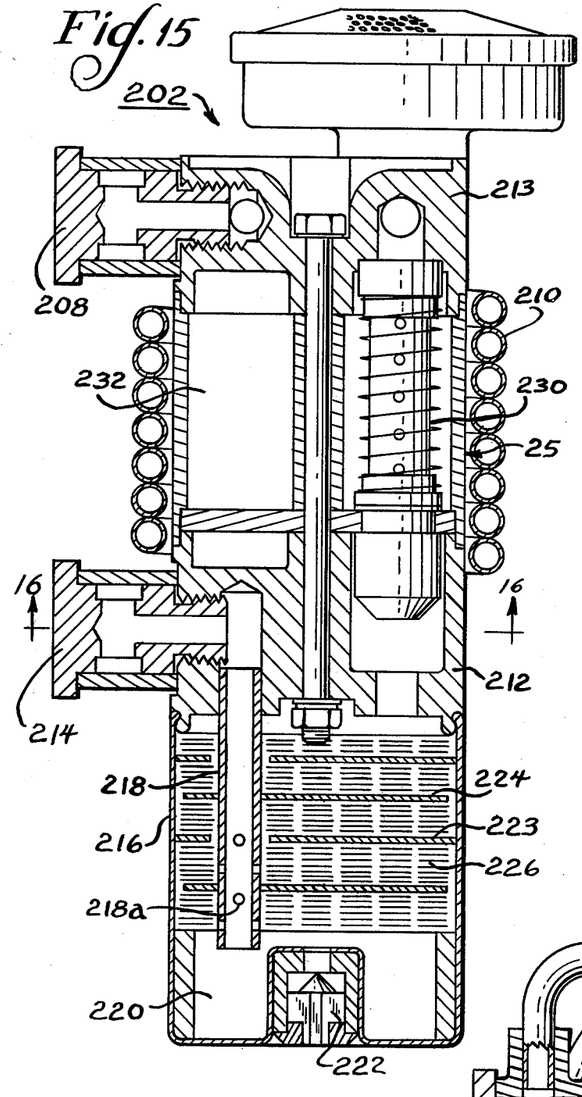
FIG. 15 is a partially sectional view of a device according to the invention taken along line 15—15 of FIG. 12.
Figure 16:
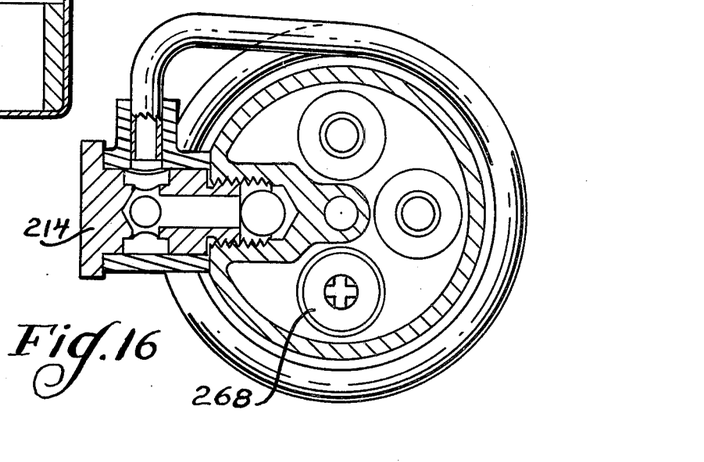
FIG. 16 is a sectional view of a device according to the invention taken along line 16—16 of FIG. 15.

FIG. 15 of the drawings shows in more detail the internal construction of a pollution separator 202 according to the invention. The filter housing 216 is a cannister arrangement fixed to the lower end of the base cap 212 as shown. Cooled gases exiting from the helical cooling coil 210 enter the fitting 214 and are conducted through a pipe 218 extending downwardly from the base cap 212 to a pollutant collection chamber 220 at the bottom of the filter housing 216. Also contained in the bottom of the filter housing 216 is a vacuum operated valve assembly 222 which is closed in response to vacuum pressure being present in the pollutant separator 202. Contained within the filter housing 216 is a labrynth structure formed by plates such as shown in reference numeral 223 extending inwardly from the sidewalls of the filter housing 216. Extending from the pipe 218 are plates 224 with porous layers of filtration material 226 positioned therebetween. The pipes 218 has formed therein holes (typically shown 218a) for circulating vapors through the filter.

Figure 17:
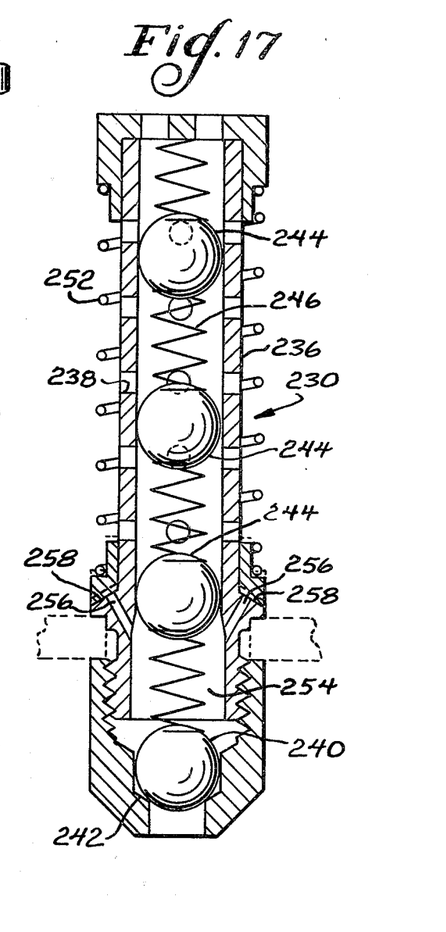
FIG. 17 is an enlarged cutaway view of a scrubber unit such as shown in FIG. 15 of the drawing.
Figure 18:
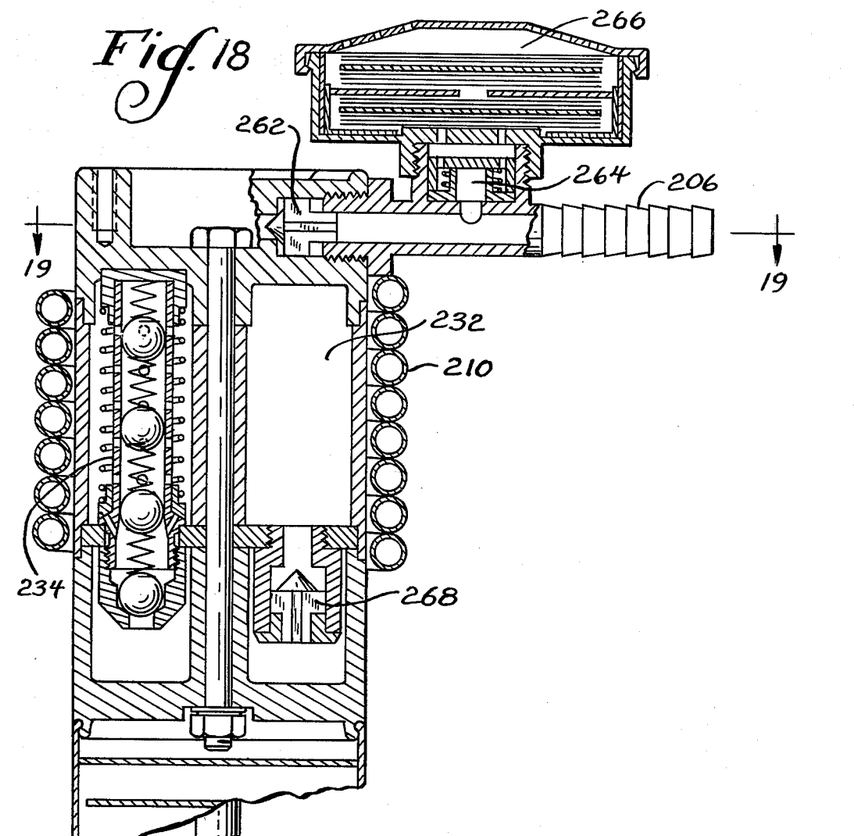
FIG. 18 is a partial sectional view of a device according to the invention.
Figure 19:
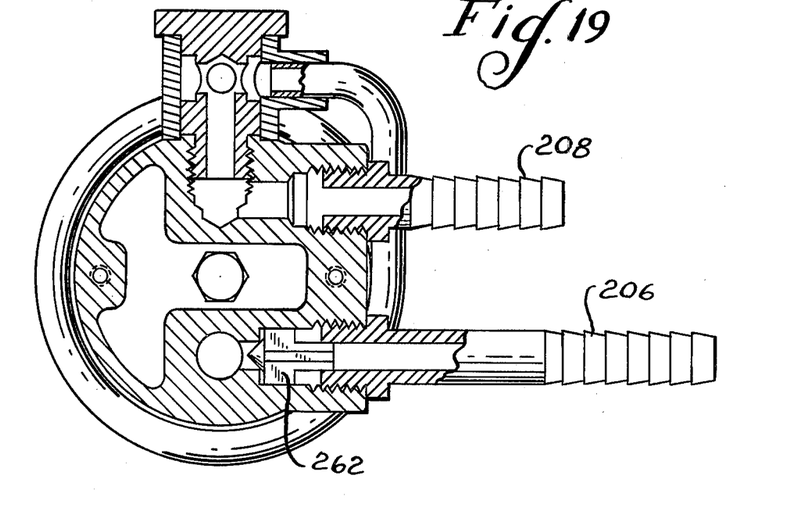
FIG. 19 is a sectional view of a device according to the invention taken along line 19—19 of FIG. 18.

Fluid flows out of the filter housing 216 and into a primary scrubber means 230 as shown in detail in FIG. 17 of the drawings. The primary scrubber means 230 is positioned within the housing 25 in a chamber 232 having a secondary scrubber means 234 also contained therein as shown in FIG. 18 of the drawings. The secondary scrubber means 234 operates in the same fashion as the primary scrubber 230 with the exception that the secondary scrubber means has no outlet to the barbed outlet connector 206.

Referring again to FIG. 17 of the drawings, the primary scrubber means 230 includes a tube 236 mounted within the housing 25 and having a plurality of apertures (typically shown as 238) in the walls thereof communicating with the chamber 232. The lower portion of the primary scrubber means 230 has a check ball 240 contained therein and forming a seal with a valve surface 242 formed within the interior of the scrubber means. Plurality of scrubber balls 244 are contained within the tube 236 with the scrubber balls 244 having diameters slightly less than the internal diameter of the tube 236. The scrubber balls 244 are spaced apart and separated by resilient biasing means, or springs 246. In operation as fluid is drawn through the scrubber 230 by vacuum pressure the check ball opens to permit fluid to flow therethrough. A ring 250 circles the outer surface of a portion of the tube 236 to block some of the apertures 236 located near the lower end of the tube 236. A spring 252 positioned around the tube 236 provides a biasing force for the ring 250 between shoulders formed on the ring 250 and the top portion of the valve assembly, as shown. Contained within the bottom of the tube 236 is a slightly flared bore 254 which has extending therefrom a conduit 256, the outlet of which conduits bear against lower shoulder portions 258 of the ring 250. It is desirable that the scrubber balls 244 as biased by the springs 246 vibrate to encourage scrubbing action. To encourage this vibratory scrubber action the ring valve alternately spills vapor due to the action of vapor passing through the conduits 256 and impinging upon the shoulders 258 of the ring 250. As vapors fill the drop in pressure causes the ring 250 to slide down the tube 236. This action encourages vibratory motion of the scrubber balls with vapor flowing in and out of the scrubber means through the apertures 238. The secondary scrubber means 234 operates in a similar fashion. Fluid reaching the top of the primary scrubber means 230 is then passed, as shown in FIG. 18 of the drawings, through an antibackfire check valve 262 to the barbed outlet connection 206. A metering valve 264 provides air through which is drawn through the air filter 266 to the outlet where it is mixed with the gaseous output of the filter so as to provide additional combustion air to the engine fed by the barbed outlet connection 206. The valve 264 is normally open and closes to varying degrees depending upon the magnitude of the vacuum within the outlet. A valve 268 as well as the valve 222 at the bottom of the filter permit pollutants to drain when the vacuum pressure is cut off or when the engine is stopped.

I claim:

1. A pollutant separator for reducing contaminants in a flow from a source of emission to a utilization point comprising:
   a cooling coil having an inlet and an outlet, said cooling coil inlet being coupled to the source of emissions;
   filter means having an inlet and an outlet, said filter means inlet coupled to the outlet of the cooling coil;
   a scrubber unit having an inlet and an outlet, the scrubber unit inlet coupled to the filter means outlet and the scrubber unit outlet coupled to the utilization point, the scrubber unit including;
   a closed chamber;
   a primary scrubber tube having a first and a second end and having a plurality of holes in the wall thereof communicating with the closed chamber, the first end of the primary scrubber tube being coupled to the filter means outlet and the second end of the primary scrubber tube being coupled to the utilization device, the scrubber tube having an external shoulder;
   a plurality of scrubber balls movably positioned within the bore of said tube;
   a plurality of springs each respectively arranged between two of the scrubber balls to provide resilient biasing of said balls;
   a ring valve movably covering a portion of the outer surface of the primary scrubber tube, the ring valve having a shoulder portion extending outwardly;
   a ring valve spring for biasing the ring valve shoulder and the scrubber tube into context;
   a fluid passage connecting the interior of the primary scrubber tube to the surface of the scrubber tube shoulder such that fluid pressure is exerted therethrough to the shoulder of the ring valve to provide fluctuating pressure within the scrubber means to enhance motion of the scrubber balls therein.

2. The pollutant separator of claim 1 wherein the cooling coil is a tube formed in a helix encircling the scrubber unit.

3. The pollutant separator of claim 1 wherein the filter means includes porous filtration means interspersed with solid partition walls in a labrynth configuration.

4. The pollutant separator of claim 1 where the filter means includes a pressure-operated check valve closed vent to ambient by passage of fluid through the filter means.

5. The pollutant separator of claim 1 wherein the scrubber unit includes a primary scrubber tube having a ball seat portion located at the first inlet thereof and wherein the scrubber unit includes a check valve ball and a spring located between said check valve ball and one of the plurality of scrubber balls.

6. The pollutant separator of claim 1 including an outlet check valve opened by fluid flow out of the scrubber unit.

7. The pollutant separator of claim 1 including a second scrubber unit having an inlet and an outlet, and including plug means with the inlet of the second scrubber unit being coupled to the filter means outlet and the outlet containing the plug means to block the flow of fluid through the second end thereof so that fluid circulates between the second scrubber unit and the closed chamber.

8. The pollutant separator of claim 1 including an outlet fluid conduit located between the scrubber unit outlet and utilization device and including an air inlet valve for admitting air into the outlet fluid conduit in response to fluid pressure within the outlet fluid conduit.

9. The pollutant separator of claim 8 including air filter means connected between the air inlet valve and the air.

* * * * *

UNITED STATES PATENT AND TRADEMARK OFFICE
CERTIFICATE OF CORRECTION

PATENT NO. : 4,213,770
DATED : July 22, 1980
INVENTOR(S) : John W. Schaefer

It is certified that error appears in the above—identified patent and that said Letters Patent is hereby corrected as shown below:

Column 1, line 31, delete "the". Column 3, line 65, "pecipitator" should read -- precipitator --. Column 4, line 52, "blowby" should read -- blow-by --. Column 5, line 32, "extends" should read -- extend --. Column 6, line 37, "82a" should read -- 83a --. Column 7, line 55, "91c" should read -- 91a --. Column 7, line 65, "communication" should read -- communicating --. Column 8, line 13, "ramdom" should read -- random --. Column 8, line 18, "pullutants" should read -- pollutants --. Column 8, line 19, "handles" should read -- handle --. Column 10, line 48, "labrynth" should read -- labyrinth --.

Signed and Sealed this

Ninth Day of December 1980

[SEAL]

Attest:

SIDNEY A. DIAMOND

Attesting Officer

Commissioner of Patents and Trademarks